United States Patent
Yoshida et al.

(10) Patent No.: US 12,095,063 B2
(45) Date of Patent: Sep. 17, 2024

(54) BATTERY SYSTEM, ELECTRIC VEHICLE EQUIPPED WITH BATTERY SYSTEM, AND ELECTRICITY STORAGE DEVICE

(71) Applicant: SANYO Electric Co., Ltd., Osaka (JP)

(72) Inventors: Naotake Yoshida, Hyogo (JP); Tomoaki Ito, Hyogo (JP); Takuya Egashira, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 803 days.

(21) Appl. No.: 17/256,180

(22) PCT Filed: Jul. 8, 2019

(86) PCT No.: PCT/JP2019/026965
§ 371 (c)(1),
(2) Date: Dec. 25, 2020

(87) PCT Pub. No.: WO2020/013120
PCT Pub. Date: Jan. 16, 2020

(65) Prior Publication Data
US 2021/0273278 A1 Sep. 2, 2021

(30) Foreign Application Priority Data
Jul. 9, 2018 (JP) .................................. 2018-130288

(51) Int. Cl.
*H01M 10/625* (2014.01)
*B60L 50/64* (2019.01)
(Continued)

(52) U.S. Cl.
CPC ......... *H01M 10/6554* (2015.04); *B60L 50/64* (2019.02); *H01M 10/441* (2013.01);
(Continued)

(58) Field of Classification Search
CPC ............ H01M 10/625; H01M 10/658; H01M 10/613
See application file for complete search history.

(56) References Cited

U.S. PATENT DOCUMENTS

| 5,578,393 | A | * | 11/1996 | Haskins | .............. | H01M 10/658 |
| | | | | | | 429/62 |
| 2011/0177366 | A1 | * | 7/2011 | Nagasaki | ............ | H01M 10/659 |
| | | | | | | 429/83 |

(Continued)

FOREIGN PATENT DOCUMENTS

| JP | 2008-059950 | 3/2008 |
| JP | 2012-248299 | 12/2012 |

(Continued)

OTHER PUBLICATIONS

International Search Report of PCT application No. PCT/JP2019/026965 dated Oct. 1, 2019.

*Primary Examiner* — Kenneth J Douyette
(74) *Attorney, Agent, or Firm* — WHDA, LLP (57) ABSTRACT

A battery system incudes battery stack formed by stacking a plurality of battery cells and cooling plate thermally coupled to battery cell of battery stack. Heat insulating material is disposed between battery cells of battery stack, which are adjacent to each other, and heat insulating material insulates heat between battery cells adjacent to each other. In addition, cooling plate cools battery cell, is used in combination with an endothermic material having heat capacity to absorb thermal runaway energy of battery cell, and prevents induction of thermal runaway.

7 Claims, 8 Drawing Sheets

(51) Int. Cl.
*H01M 10/44* (2006.01)
*H01M 10/613* (2014.01)
*H01M 10/647* (2014.01)
*H01M 10/6554* (2014.01)
*H01M 10/6568* (2014.01)
*H01M 10/658* (2014.01)
*H01M 50/209* (2021.01)
*H01M 50/24* (2021.01)
*H01M 50/249* (2021.01)
*B60K 1/00* (2006.01)
*B60K 1/04* (2019.01)
*B60K 6/28* (2007.10)
*B60L 58/26* (2019.01)
*H02J 7/00* (2006.01)

(52) U.S. Cl.
CPC ....... *H01M 10/613* (2015.04); *H01M 10/625* (2015.04); *H01M 10/647* (2015.04); *H01M 10/6568* (2015.04); *H01M 10/658* (2015.04); *H01M 50/209* (2021.01); *H01M 50/24* (2021.01); *H01M 50/249* (2021.01); *B60K 2001/005* (2013.01); *B60K 1/04* (2013.01); *B60K 6/28* (2013.01); *B60L 58/26* (2019.02); *B60Y 2200/91* (2013.01); *B60Y 2200/92* (2013.01); *B60Y 2306/05* (2013.01); *B60Y 2400/112* (2013.01); *H01M 2220/20* (2013.01); *H02J 7/007* (2013.01)

(56) References Cited

U.S. PATENT DOCUMENTS

| 2012/0009455 | A1* | 1/2012 | Yoon | H01M 10/6554 |
| | | | | 429/120 |
| 2012/0107665 | A1* | 5/2012 | Abe | H01M 50/204 |
| | | | | 219/548 |
| 2012/0298433 | A1 | 11/2012 | Ohkura | |
| 2013/0076127 | A1 | 3/2013 | Kunimitsu et al. | |
| 2017/0271726 | A1* | 9/2017 | Shen | H01M 10/653 |

FOREIGN PATENT DOCUMENTS

| JP | 2013-072816 | 4/2013 |
| JP | 3191519 U | 6/2014 |
| JP | 2017-027962 | 2/2017 |
| JP | 2017-524240 | 8/2017 |
| WO | 2013/084756 | 6/2013 |
| WO | 2015/179625 | 11/2015 |
| WO | 2017/033412 | 3/2017 |

* cited by examiner

BATTERY SYSTEM, ELECTRIC VEHICLE EQUIPPED WITH BATTERY SYSTEM, AND ELECTRICITY STORAGE DEVICE

CROSS-REFERENCE TO RELATED APPLICATIONS

This application is a U.S. national stage application of the PCT International Application No. PCT/JP2019/026965 filed on Jul. 8, 2019, which claims the benefit of foreign priority of Japanese patent application No. 2018-130288, filed on Jul. 9, 2018, the contents all of which are incorporated herein by reference.

TECHNICAL FIELD

The present invention relates to a battery system in which a plurality of battery cells are stacked, and an electric vehicle and an electricity storage device equipped with the battery system.

BACKGROUND ART

A battery system in which a plurality of battery cells are stacked is used for various purposes. In this battery system, the battery cell may undergo thermal runaway due to various causes such as internal short circuit and overcharge. When the battery cell undergoes thermal runaway, the temperature of the battery rises sharply to several hundred degrees or more. In particular, in a battery system in which a large number of battery cells are stacked, if a battery cell that has undergone thermal runaway acts as a trigger cell to induce thermal runaway in the battery cell next to the trigger cell, extremely large heat energy is generated, making it even more dangerous. In order to prevent such adverse effects, a battery system having a structure that protects against the induction of thermal runaway has been developed. (See PTL 1)

CITATION LIST

Patent Literature

PTL 1: Unexamined Japanese Patent Publication (Translation of PCT Application) No. 2017-524240

SUMMARY OF THE INVENTION

The battery system described in PTL 1 is provided with an endothermic material that absorbs heat energy of a lithium-ion battery that has undergone thermal runaway. The endothermic material is non-hydrous carbonate, sulfate, phosphate, or the like. The endothermic material is sodium hydrogen carbonate or the like, which decomposes when the temperature exceeds a predetermined temperature to generate sodium carbonate, carbon dioxide, and water. This battery system allows the endothermic material to absorb the heat energy of the trigger cell. However, since the recent battery cells increase a charge/discharge capacity, an energy generated by the battery cell that has undergone thermal runaway is extremely large, and in order to prevent the induction of thermal runaway, it is necessary for the endothermic material to absorb a large amount of heat energy. While an endothermic material that absorbs a large amount of heat energy is heavy and large, the battery system is required to be lighter and smaller. Therefore, it is not realistic to provide a large amount of endothermic material, and it is extremely difficult to prevent the induction of thermal runaway due to the endothermic material.

The present invention has been developed in order to eliminate the drawbacks described above. It is an object of the present invention to provide a technique capable of preventing the induction of thermal runaway with a simple structure.

A battery system of the present invention includes a battery stack formed by stacking a plurality of battery cells and a cooling plate thermally coupled to each of the plurality of battery cells of the battery stack. In this battery system, a heat insulating material is disposed between the battery cells of the battery stack that are adjacent to each other, and the heat insulating material insulates heat between the battery cells adjacent to each other. In addition, the cooling plate cools each of the plurality of battery cells, servers as an endothermic material having heat capacity to absorb a thermal runaway energy of each of the plurality of battery cells, and prevents induction of thermal runaway.

An electric vehicle including a battery system including the configuration elements of the above aspect includes the battery system, a driving motor supplied with electric power from the battery system, a vehicle body including the battery system and the motor mounted on the vehicle body, and a wheel driven by the motor to travel the vehicle body.

An electricity storage device including a battery system including the configuration elements of the above aspect includes the battery system and a power supply controller for controlling charging/discharging to the battery system. In this electricity storage device, the power supply controller enables a prismatic battery cell to be charged by external power and controls the battery cell to be charged.

The battery system of the present invention has a feature that it can prevent the induction of thermal runaway with a simple structure. This is because in the battery system of the present invention, the heat insulating material is disposed between the battery cells to block the heat energy of the trigger cell that has undergone thermal runaway from being conducted to the battery cell next to the trigger cell, and, in addition, a cooling plate that cools the battery cell to keep a temperature of the battery cell at a set temperature is used in combination with the endothermic material for the heat energy of the trigger cell that has undergone thermal runaway, to absorb the heat energy. That is, in the heat energy of the trigger cell that has undergone thermal runaway, the conduction to the battery cell next to the trigger cell is reduced by the heat insulating material. In addition, it is characterized in that in order to prevent the induction of thermal runaway, there is no need to provide a dedicated member such as an endothermic material as in the related art, and due to a unique structure that absorbs the heat energy by using the cooling plate in combination with the endothermic material, the induction of thermal runaway can be prevented while reducing the size and weight of the battery system.

DESCRIPTION OF EMBODIMENTS

In a battery system of one aspect of the present invention, a cooling plate that cools each battery cell and controls the temperature to a set temperature is thermally coupled to a battery stack in which a plurality of the battery cells are stacked. In the battery stack, a heat insulating material is disposed between the battery cells adjacent to each other in order to insulate heat energy conducted from a trigger cell that has undergone thermal runaway to the battery cell next to the trigger cell. Here, if the heat insulating material can completely block the heat energy of the trigger cell that has undergone thermal runaway, the induction of thermal runaway can be prevented. However, since a heat generation amount of the trigger cell that has undergone thermal runaway is considerably large, it is extremely difficult to insulate the heat energy only by the heat insulating material. If only the heat insulating material is used to prevent the induction of thermal runaway, the heat insulating material that achieves this is extremely thick. In a battery stack in which a thick heat insulating material is stacked on the battery cell, the heat insulating material is sandwiched between all of the plurality of battery cells, so that the entire battery stack becomes extremely large and cannot be put into practical use.

In the battery system according to an aspect of the present invention, the induction of thermal runaway is not prevented only by the heat insulating material. In the battery system, a cooling plate that cools the battery cell to a set temperature is used in combination with an endothermic material having a heat capacity to absorb a thermal runaway energy of the trigger cell to prevent the induction of thermal runway. The cooling plate is forcibly cooled from the outside by a cooling mechanism and is provided for the purpose of cooling the battery cell to a set temperature. Therefore, the cooling mechanism of the cooling plate cannot quickly dissipate a large thermal runaway energy generated in a short time. The battery system of the present invention prevents the induction of thermal runaway by absorbing the thermal runaway energy to rise the temperature of itself and utilizing the heat energy absorbed. That is, in the battery system of the present invention, the cooling plate is used in combination with the endothermic material to prevent the induction of thermal runaway. The temperature of the cooling plate rises due to the heat energy conducted from the battery cell, drops due to the heat energy dissipated to the outside, and changes depending on a difference between the conducted heat energy and the dissipated heat energy. That is, the heat energy of the battery cell is conducted to the cooling plate to raise the temperature of the cooling plate, and then is dissipated to the outside. The cooling plate that absorbs heat and rises in temperature quickly absorbs the heat energy of the trigger cell and rises in temperature. In the cooling plate, the heat energy absorbed increases in proportion to the temperature rise due to heat absorption. Since the temperature of the trigger cell that has undergone thermal runaway becomes extremely high, the temperature of the cooling plate is raised to conduct a large amount of heat energy to the cooling plate. In other words, the heat energy of the trigger cell is quickly conducted to the cooling plate. The cooling plate quickly absorbs the thermal runaway energy of the trigger cell, thereby preventing the induction of thermal runaway. This is because the temperature of the trigger cell is lowered by the cooling plate.

In the battery system, thermal resistance of the heat insulating material and the heat capacity of the cooling plate are preferably set values that can prevent the induction of thermal runaway. In this battery system, the heat energy thermally conducted from the trigger cell that has undergone thermal runaway to the adjacent battery cell is controlled by the thermal resistance of the heat insulating material, and the temperature rise of the trigger cell can be controlled by the heat capacity of the cooling plate to prevent the induction of thermal runaway.

In addition, the battery system may be provided with an external endothermic portion that is thermally coupled to the cooling plate and increases the heat capacity of the cooling plate. This external endothermic portion can be achieved, for example, by a fixing member for fixing the cooling plate, and in the case of a battery system for a vehicle, the endothermic portion can be achieved by a vehicle chassis or the like connected via the fixing member. This battery system is characterized in that the heat capacity of the cooling plate can be substantially increased to prevent the induction of thermal runaway more effectively, and the heat capacity of the cooling plate can be reduced to prevent the induction of thermal runaway.

In addition, the battery system may have a structure in which the battery stack is provided with an endothermic plate that is stacked on the heat insulating material and thermally coupled to each of the plurality of battery cells, and the endothermic plate is thermally coupled to the cooling plate. This battery system is characterized in that the heat energy of the trigger cell that has undergone thermal runaway can be effectively thermally conducted to the cooling plate via the endothermic plate that can be thermally coupled over a wide area, and the induction of thermal runaway can be prevented more effectively.

The cooling plate may be provided with a heat insulating portion between thermal coupling portions of the battery cells adjacent to each other. This heat insulating portion may be a slit provided in the cooling plate. This battery system can more effectively prevent the induction of thermal runaway by reducing conduction of the heat energy of the trigger cell that has undergone thermal runaway to the battery cell next to the trigger cell via the cooling plate at the heat insulating portion.

In addition, in the battery system, a heat diffusion sheet may be stacked between the cooling plate and the battery stack. This battery system allows the heat diffusion sheet to more effectively conduct the heat energy of the trigger cell that has undergone thermal runaway to the cooling plate and can prevent the induction of thermal runaway.

Hereinafter, the present invention will be described in detail with reference to the drawings. In the description below, the terms indicative of specific directions or positions (e.g., "upper", "lower", and other words including these words) are used as appropriate. The use of these terms is to make the understanding of the present invention easy with reference to the drawings, and does not limit the technical scope of the present invention by their meanings. The parts indicated with the same reference characters represented in a plurality of the drawings denote the same or equivalent parts or members.

In addition, the exemplary embodiments described below show specific examples of the technical idea of the present invention, and it is not intended to limit the present invention to the following exemplary embodiments. Unless specifically stated otherwise, the dimensions, materials, shapes and relative arrangements, among others, of the components described below do not intend to limit the scope of the present invention to these dimensions, materials, shapes, and relative arrangements, etc., and intended to exemplify. Moreover, details described in one exemplary embodiment and one Example are also applicable to another exemplary embodiment and another Example. Furthermore, the sizes, positional relationship, and the like of members shown in the drawings may be exaggerated for clarity.

The battery system of the present invention is mainly mounted on a vehicle such as a hybrid vehicle or an electric vehicle, or is used for an electricity storage device that supplies electric power to a large server in the event of a power failure. Since this battery system has a large charge/discharge current and is used under various external conditions, if any battery cell undergoes thermal runaway, the battery cell may be suddenly heated to an abnormal temperature. The battery system has a unique structure to effectively prevent the induction of thermal runaway. Hereinafter, specific examples of the battery system that achieves this will be described with reference to FIGS. 1 to 5.

Figure 1:
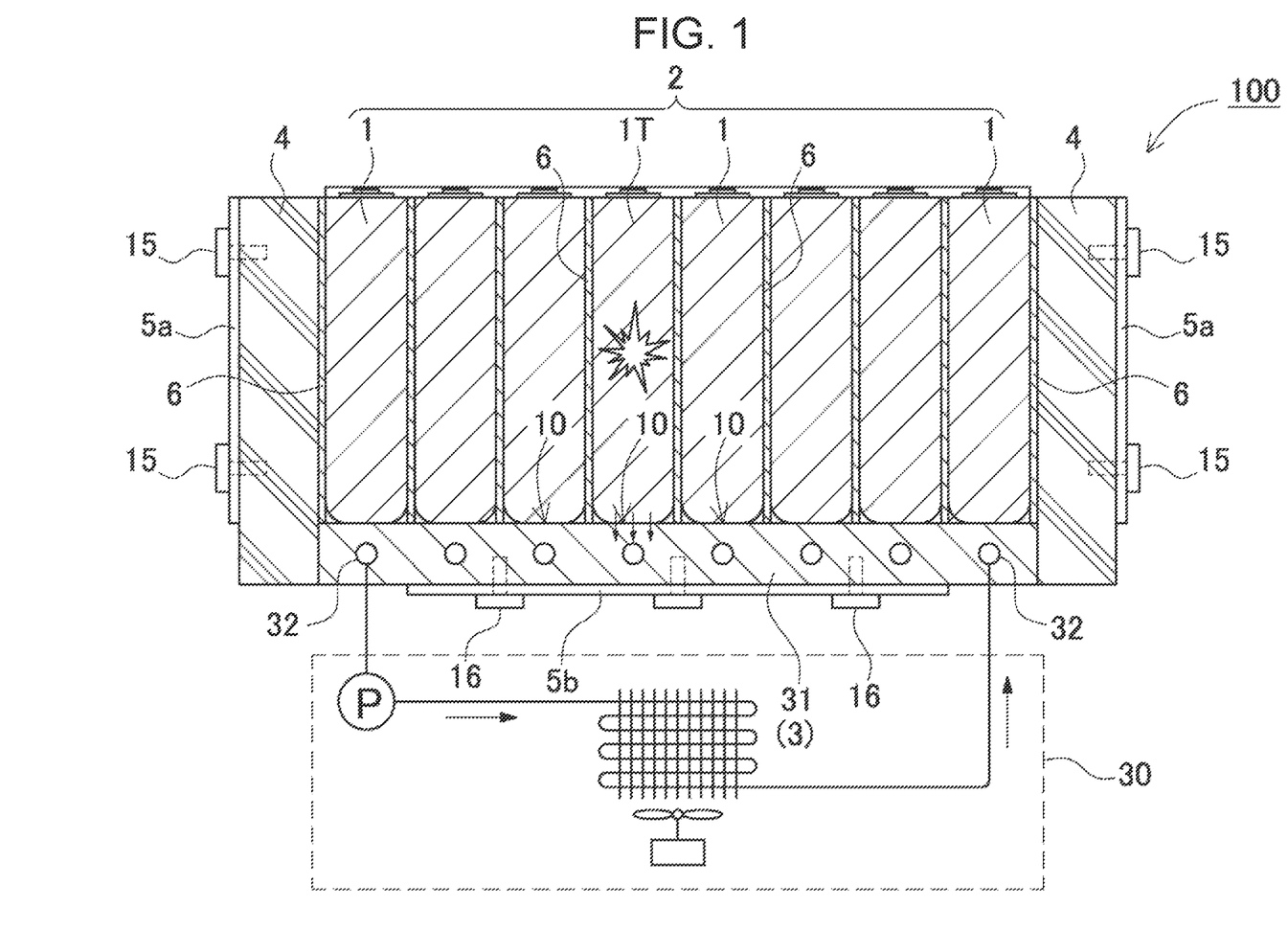
FIG. 1 is a schematic cross-sectional view of a battery system according to a first exemplary embodiment of the present invention.
Figure 2:
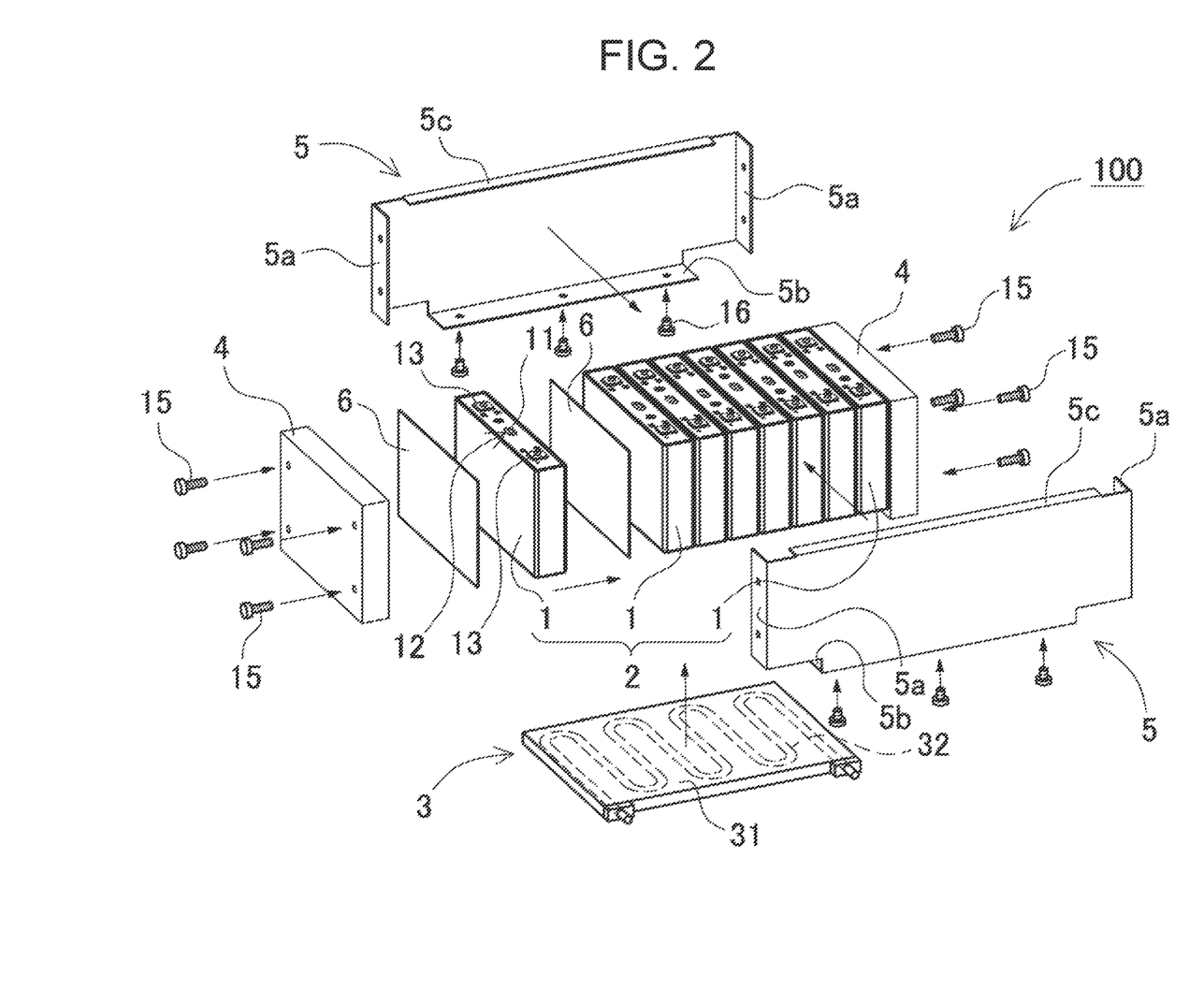
FIG. 2 is an exploded perspective view of the battery system shown in FIG. 1.

In battery system 100 shown in the schematic cross-sectional view of FIG. 1 and the exploded perspective view of FIG. 2, cooling plate 3 is disposed on a bottom surface of battery stack 2 in which a plurality of battery cells 1 are stacked. Cooling plate 3 cools each battery cell 1 and keeps the temperature of battery cell 1 at a set temperature. In battery system 100 shown in the figure, end plates 4 are arranged on both end surfaces of battery stack 2. The pair of end plates 4 are connected by bind bars 5 to hold the plurality of battery cells 1 in a pressurized state.

(Battery Cell 1)

As shown in FIG. 2, battery cell 1 is a prismatic battery having a width larger than the thickness, in other words, a prismatic battery having a thickness smaller than the width, and is stacked in a thickness direction to form battery stack 2. Battery cell 1 is a non-aqueous electrolyte battery having a battery case as a metal case. Battery cell 1 which is a non-aqueous electrolyte battery is a lithium ion secondary battery. However, the battery cell can also be a secondary battery such as a nickel hydride battery or a nickel cadmium battery. Battery cell 1 in the figure is a prismatic battery in which wide main surfaces on both sides are quadrilaterals, and battery cell 1 is stacked such that the main surfaces face each other to form battery stack 2.

In battery cell 1, an electrode body (not shown) is housed in a metal battery case having a square outer shape, and the battery case is filled with an electrolyte solution. The battery case composed of a metal case can be formed of aluminum or an aluminum alloy. The battery case includes an exterior can in which a metal sheet is pressed into a tubular shape that closes the bottom, and a sealing plate that airtightly closes an opening of the exterior can. The sealing plate is a flat metal sheet, and its outer shape is the shape of the opening of the exterior can. The sealing plate is fixed to a peripheral edge of the exterior can by laser welding, and airtightly closes the opening of the exterior can. In the sealing plate fixed to the exterior can, positive and negative electrode terminals 13 are fixed at both end portions of the sealing plate, and gas exhaust port 12 is provided between the positive and negative electrode terminals. Inside gas exhaust port 12, exhaust valve 11 that opens at a predetermined internal pressure is provided.

The plurality of battery cells 1 stacked on each other are connected in series and/or in parallel with each other by connecting positive and negative electrode terminals 13. In the battery system, positive and negative electrode terminals 13 of battery cells 1 adjacent to each other are connected in series and/or in parallel with each other via a bus bar (not shown). In the battery system, battery cells 1 adjacent to each other can be connected in series with each other to increase an output voltage, and thus to increase output, and the battery cells adjacent to each other can be connected in parallel to increase the charge/discharge current.

(Battery Stack 2)

In battery stack 2 shown in FIG. 2, the plurality of battery cells 1 are stacked in the thickness direction. In battery stack 2 shown in FIG. 1 and FIG. 2, the plurality of battery cells 1 are stacked in an attitude in which surfaces provided with the exhaust valves are located substantially on the same surface, and the exhaust valves of battery cells 1 are arranged on the same plane. In battery stack 2 shown in the figure, the plurality of battery cells 1 are stacked in an attitude in which the sealing plate provided with the exhaust valve is an upper surface.

(Cooling Plate 3)

Cooling plate 3 is formed from metal sheet 31 such as aluminum or an aluminum alloy having excellent thermal conductivity characteristics. Since cooling plate 3 is used in combination with an endothermic material that absorbs thermal runaway energy to prevent the induction of thermal runaway, the heat capacity can be increased to increase the thermal runaway energy to be absorbed. The heat capacity of cooling plate 3 is an amount of heat that raises the temperature by 1° C., and increases in proportion to a product of a mass of cooling plate 3 and specific heat. Cooling plate 3 having large heat capacity can increase endothermic energy of the thermal runaway energy to reduce temperature rise, and efficiently absorbs the thermal runaway energy of trigger cell 1T.

Cooling plate 3 of FIG. 1 and FIG. 2 includes cooling liquid circulating path 32 provided inside. Cooling plate 3 can increase the heat energy absorbed by a coolant in circulating path 32. This is because heat of vaporization at which the coolant boils absorbs the heat energy. Cooling plate 3 cools battery cell 1 with the coolant circulated in circulating path 32, boils the coolant, and absorbs the thermal runaway energy of trigger cell 1T. Cooling plate 3 connects cooling mechanism 30 to circulating path 32. Cooling mechanism 30 cools the coolant and circulates the coolant in circulating path 32 of cooling plate 3 to cool battery cell 1 through cooling plate 3.

In battery system 100 of FIG. 2, cooling plate 3 is disposed on the bottom surface of battery stack 2 in a thermally coupled state. However, cooling plate 3 can also be disposed on a side surface of battery stack 2. Battery system 100 shown in the figure has a structure in which an outer diameter of cooling plate 3 is rectangular metal sheet 31 equal to or slightly smaller or larger than a bottom surface shape of battery stack 2, and all battery cells 1 are cooled. In cooling plate 3, circulating path 32 is provided by inserting a metal pipe such as copper inside metal sheet 31, or is provided by providing a cavity inside.

(End Plate 4)

End plates 4 are arranged on both end surfaces of battery stack 2 and connected to bind bars 5 to hold the plurality of battery cells 1 in the stacking direction. End plate 4 is fixed to bind bars 5 and fixes each battery cell 1 of battery stack 2. An outer shape of end plate 4 is almost equal to or slightly larger than an outer shape of battery cell 1, and is a quadrangular plate material that includes bind bars 5 fixed to outer peripheral surfaces on both sides and has strength to suppress movement of the cell even when battery stack 2 is vibrated or impacted. End plate 4 is entirely formed of metal such as aluminum or an aluminum alloy. However, although not shown, the end plate may have a structure in which a metal sheet is stacked on plastic, or may be a fiber-reinforced resin shaped plate in which reinforcing fibers are embedded entirely.

(Bind Bar 5)

Bind bar 5 is connected to end plate 4 to hold battery cell 1 of battery stack 2 in a pressurized state, and is connected to cooling plate 3 to fix cooling plate 3 in close contact with a surface of battery stack 2. Both end portions of bind bar 5 of FIG. 1 and FIG. 2 are bent inward to provide fixing pieces 5a, and each fixing piece 5a is fixed to a surface of end plate 4 via fixing screws 15. However, the structure for fixing bind bar 5 to end plate 4 is not specified, and all other fixing structures capable of firmly fixing the both end portions of bind bar 5 to end plate 4 can be used. In addition, bind bar 5 shown in the figure is provided with inwardly bent upper bent piece 5c at an upper end of bind bar 5. Upper bent pieces 5c are arranged on the upper surfaces of both sides of battery stack 2, and terminal surfaces which are upper surfaces of the plurality of battery cells 1 stacked are arranged on the same plane.

In addition, bind bar 5 is provided with bent portion 5b fixed to a surface of cooling plate 3 so that a lower edge of bind bar 5 is bent inward. Cooling plate 3 is disposed inside bent portion 5b, on the upper surface in the figure, and is thermally coupled to a bottom surface of each battery cell 1. As shown in this figure, in a structure in which bent portion 5b of bind bar 5 is fixed to a lower surface of cooling plate 3 and cooling plate 3 is disposed inside battery system 100, cooling plate 3 can be brought into close contact with the bottom surface of battery stack 2 and fixed in a preferable thermally coupled state. In bind bar 5 extending in the stacking direction of battery stack 2, elongated bent portion 5b is fixed to cooling plate 3 via a plurality of bolts 16 penetrating bent portion 5b, and cooling plate 3 can be disposed on the bottom surface of battery cell 1 in a preferable thermally coupled state.

Bind bar 5 is an iron or iron alloy plate material, and a thick metal sheet of, for example, 1 mm or more is used in order to obtain sufficient tensile strength. Bind bar 5 formed of the metal sheet is thick, wide, and long, and, that is, the weight increases to increase the heat capacity that absorbs heat. Since bind bar 5 is fixed to cooling plate 3 and thermally coupled, heat is conducted from cooling plate 3. Therefore, bind bar 5 forms an integrated structure with cooling plate 3 to increase the substantial heat capacity of cooling plate 3.

In addition, in battery system 100 of FIG. 1 and FIG. 2, heat insulating material 6 is sandwiched between battery cells 1 adjacent to each other in order to limit heat conduction energy from trigger cell 1T to battery cell 1 next to trigger cell 1T. In battery system 100, heat insulating material 6 insulates heat between battery cells 1 adjacent to each other, and the thermal runaway energy of trigger cell 1T is conducted to cooling plate 3, so that the induction of thermal runaway is prevented. In battery system 100, heat insulating material 6 insulates heat between battery cells 1 adjacent to each other, and cooling plate 3 absorbs the thermal runaway energy of trigger cell 1T to prevent the induction of thermal runaway, so that the heat resistance of heat insulating material 6 and the heat capacity of cooling plate 3 are set to values that can prevent the induction of thermal runaway.

In addition, the battery system can thermally couple the external endothermic portion to increase the substantial heat capacity of cooling plate 3. The external endothermic portion can be achieved by, for example, a fixing piece (not shown) fixed to bind bar 5 and end plate 4 in a thermally coupled state, or a vehicle chassis in which the battery system is fixed via the fixing piece.

Figure 3:
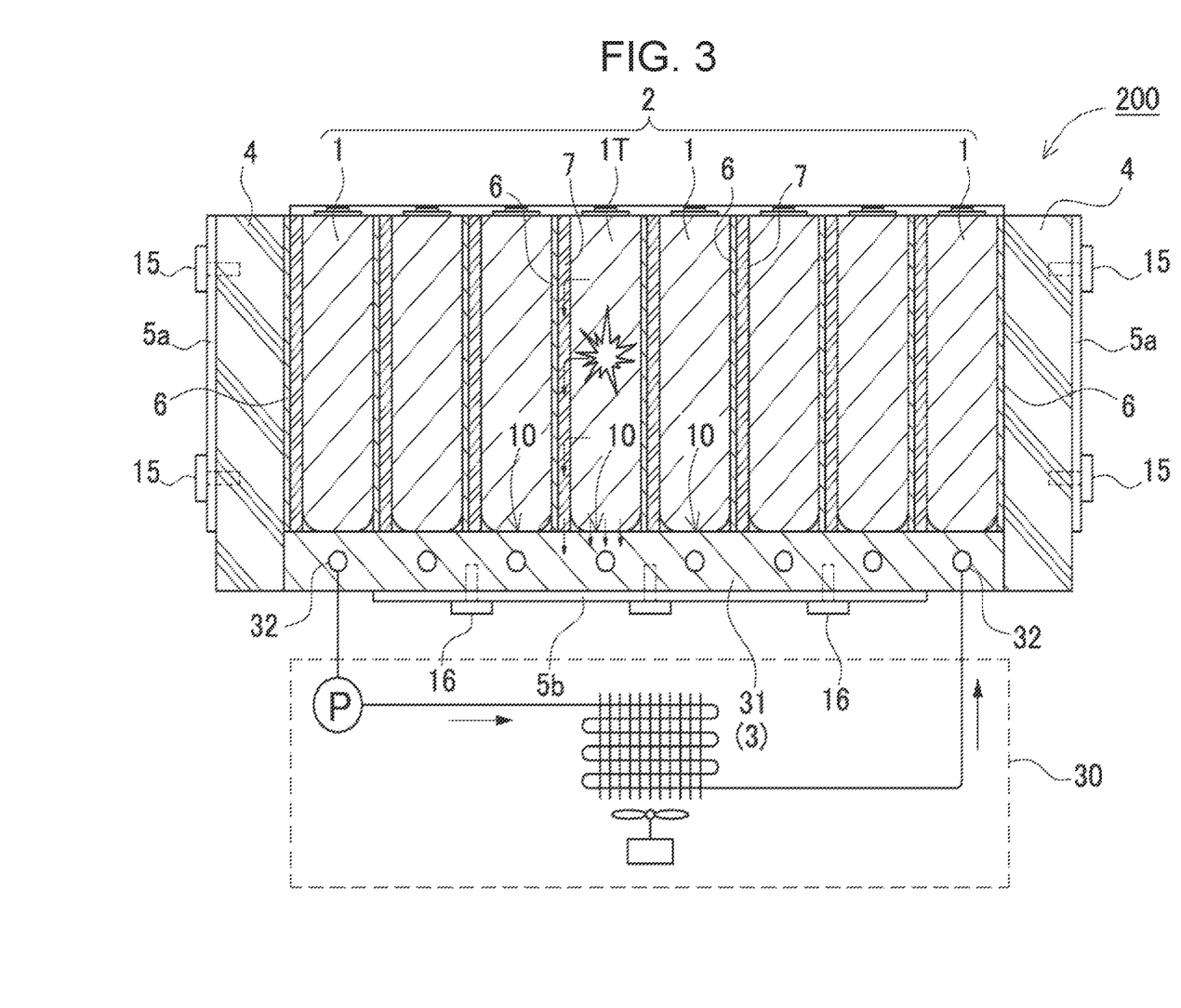
FIG. 3 is a schematic cross-sectional view of a battery system according to a second exemplary embodiment of the present invention.

In addition, in battery system 200 of FIG. 3, endothermic plate 7 that efficiently conducts the thermal runaway energy of trigger cell 1T to cooling plate 3 is disposed between battery cells 1. Endothermic plate 7 is stacked on heat insulating material 6 and disposed between battery cells 1, and a lower edge is fixed to cooling plate 3 in the figure and connected in a thermally coupled state. In battery stack 2, endothermic plate 7 and heat insulating material 6 are stacked in a two-layer structure, endothermic plate 7 is brought into close contact with the surface of one battery cell 1 and thermally coupled, and heat insulating material 6 is brought into close contact with the surface of battery cell 1 next to one battery cell 1 and blocks heat conduction. In this battery system, since endothermic plate 7 can be thermally coupled to battery cell 1 over a wide area, the heat energy of battery cell 1 can be efficiently conducted to cooling plate 3. Therefore, it is possible to reduce the temperature rise of trigger cell 1T that has undergone thermal runaway and more effectively prevent the induction of thermal runaway.

Figure 4:
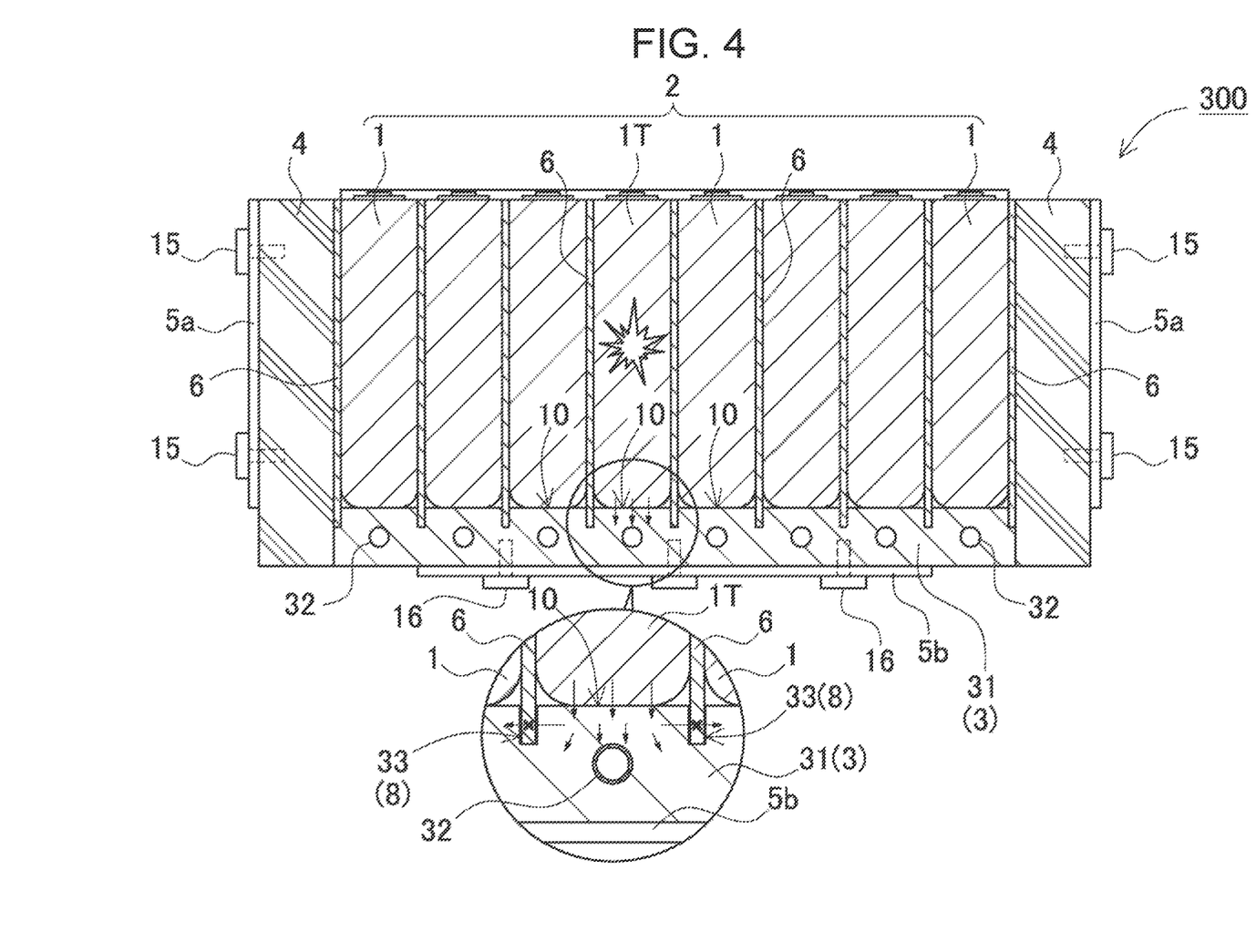
FIG. 4 is a schematic cross-sectional view of a battery system according to a third exemplary embodiment of the present invention.

In addition, in battery system 300 of FIG. 4, cooling plate 3 is provided with heat insulating portion 8 between thermal coupling portions 10 of battery cells 1 adjacent to each other. Heat insulating portion 8 limits the thermal runaway energy thermally conducted from trigger cell 1T that has undergone thermal runaway to battery cell 1 next to trigger cell 1T. This is because if cooling plate 3 efficiently conducts heat from trigger cell 1T to battery cell 1 next to trigger cell 1T, battery cell 1 next to trigger cell 1T is likely to undergo thermal runway. In cooling plate 3 in the figure, groove-shaped slit 33 is provided in a surface of metal sheet 31 to form heat insulating portion 8. Groove-shaped slit 33 blocks heat conduction and limits the heat conduction energy from trigger cell 1T to battery cell 1 next to trigger cell 1T. In particular, battery system 300 shown in the figure has a structure in which a lower end portion of heat insulating material 6 is inserted inside slit 33 provided in cooling plate 3. With this structure, the heat conduction blocking characteristic in heat insulating portion 8 is improved, and the heat conduction energy from trigger cell 1T to battery cell 1 next to trigger cell 1T is more effectively limited.

Figure 5:
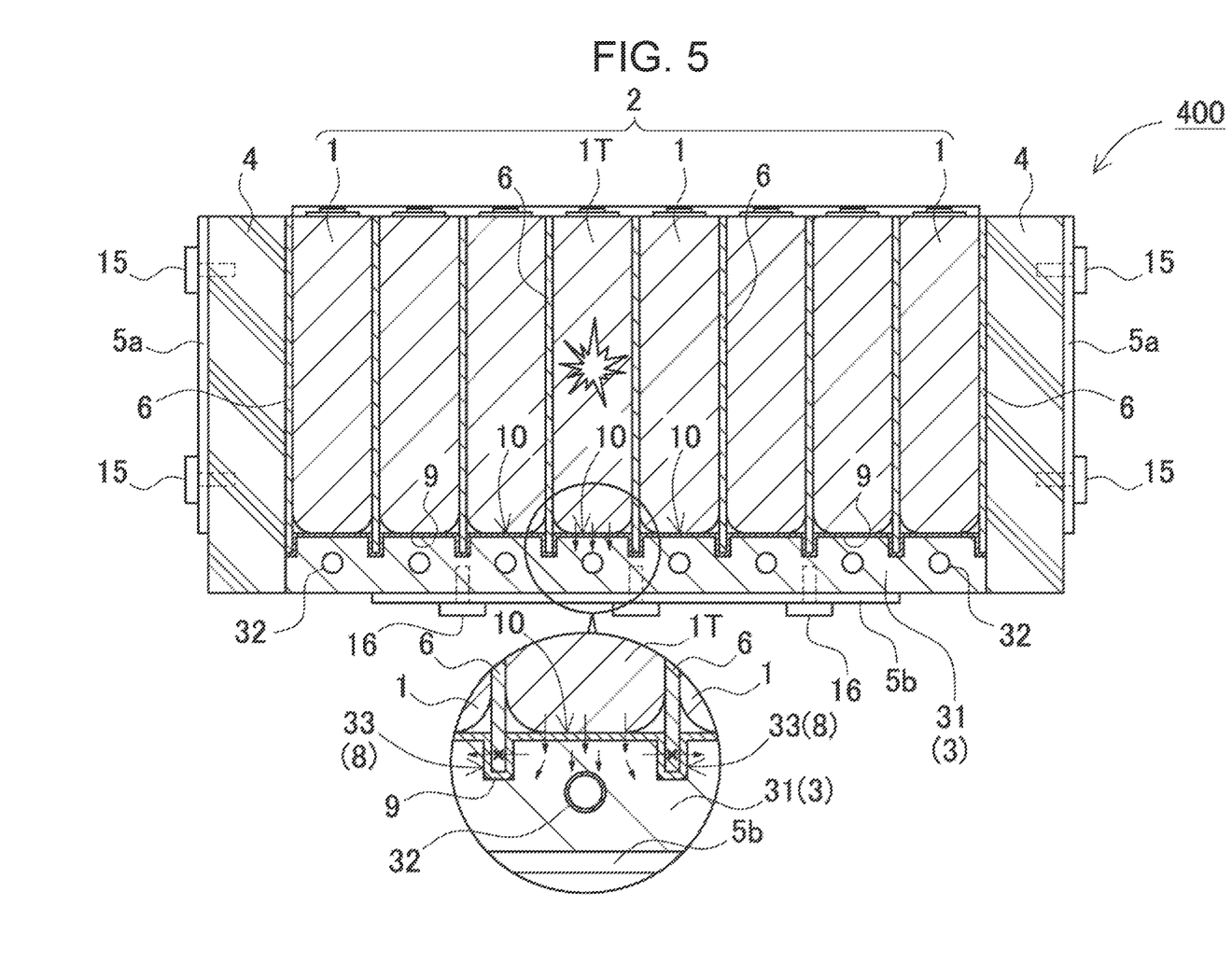
FIG. 5 is a schematic cross-sectional view of a battery system according to a fourth exemplary embodiment of the present invention.

In addition, in battery system 400 of FIG. 5, heat diffusion sheet 9 is sandwiched between cooling plate 3 and battery stack 2. Heat diffusion sheet 9 is a sheet having flexibility, cushioning properties, and excellent thermal conductivity characteristics. As heat diffusion sheet 9, a heat diffusion sheet having thermal resistance smaller than that of cooling plate 3 is preferably used. Heat diffusion sheet 9 is sandwiched between battery stack 2 and cooling plate 3, and while one surface is brought into close contact with the surface of battery stack 2, the other surface is brought into close contact with the surface of cooling plate 3 over a wide area. Battery stack 2 and cooling plate 3 are arranged in an ideal thermally coupled state.

Battery system 400 shown in FIG. 5 is provided with groove-shaped slit 33 provided in the surface of cooling plate 3, and heat diffusion sheet 9 is disposed on the entire surface on the battery stack side including an inner surface of slit 33. In addition, inside slit 33, the lower end portion of heat insulating material 6 is disposed via heat diffusion sheet 9. With this structure, the heat conduction energy from trigger cell 1T to battery cell 1 next to trigger cell 1T is limited by heat insulating portion 8 while holding battery cell 1 and cooling plate 3 in an ideal thermally coupled state. In addition, although not shown, a heat conductive paste can be applied between battery stack 2 and cooling plate 3 to bring battery cell 1 and cooling plate 3 into an ideal thermally coupled state.

The above battery system is most suitable as a power source for a vehicle that supplies electric power to a motor used to travel an electric vehicle. Examples of such an electric vehicle equipped with a battery system include electric vehicles such as a hybrid vehicle or a plug-in hybrid vehicle travelling by both an engine and a motor, and an electric vehicle that travelling only by a motor. The battery system is applied as a power source of such an electric vehicle.

(Battery System for Hybrid Vehicles)

Figure 6:
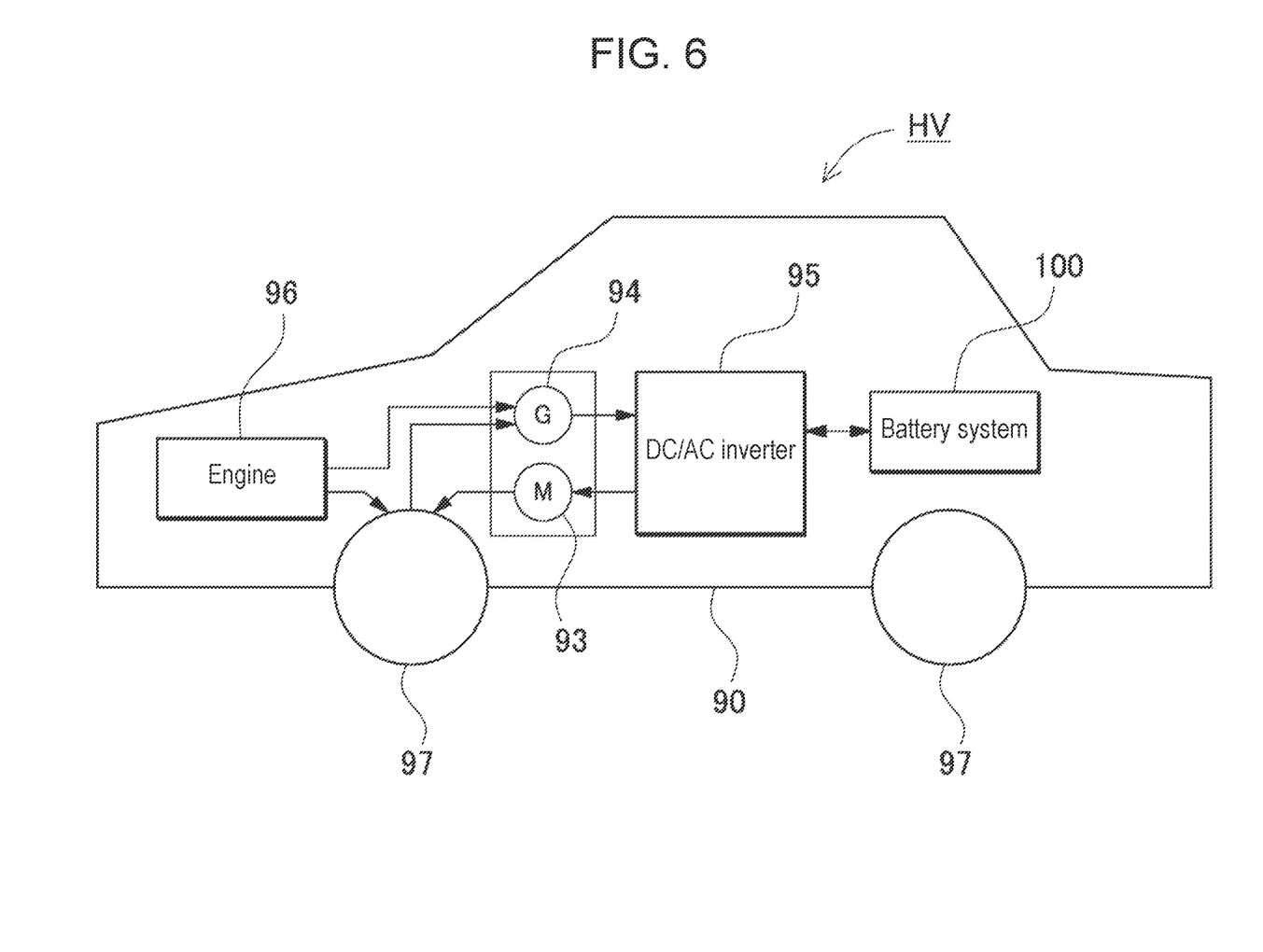
FIG. 6 is a block diagram showing an example in which the battery system is mounted on a hybrid vehicle travelling by both an engine and a motor.

FIG. 6 shows an example in which the battery system is mounted on a hybrid vehicle travelling by both an engine and a motor. Vehicle HV shown in this figure and equipped with the battery system includes vehicle body 90, engine 96 and motor 93 used to travel vehicle body 90, battery system 100 that supplies motor 93 with electric power, power generator 94 that charges batteries of battery system 100, and wheels 97 that is driven by motor 93 and engine 96 to travel vehicle body 90. Battery system 100 is connected to motor 93 and power generator 94 via DC/AC inverter 95. Vehicle HV travels by both motor 93 and engine 96 while charging and discharging the batteries in battery system 100. Motor 93 is driven to travel the vehicle during acceleration and during travel at low speed having poor engine efficiency. Motor 93 is driven when electric power is supplied from battery system 100. Power generator 94 is driven by engine 96 or driven through regenerative braking upon braking the vehicle to charge the batteries in battery system 100.

(Battery System for Electric Vehicles)

Figure 7:
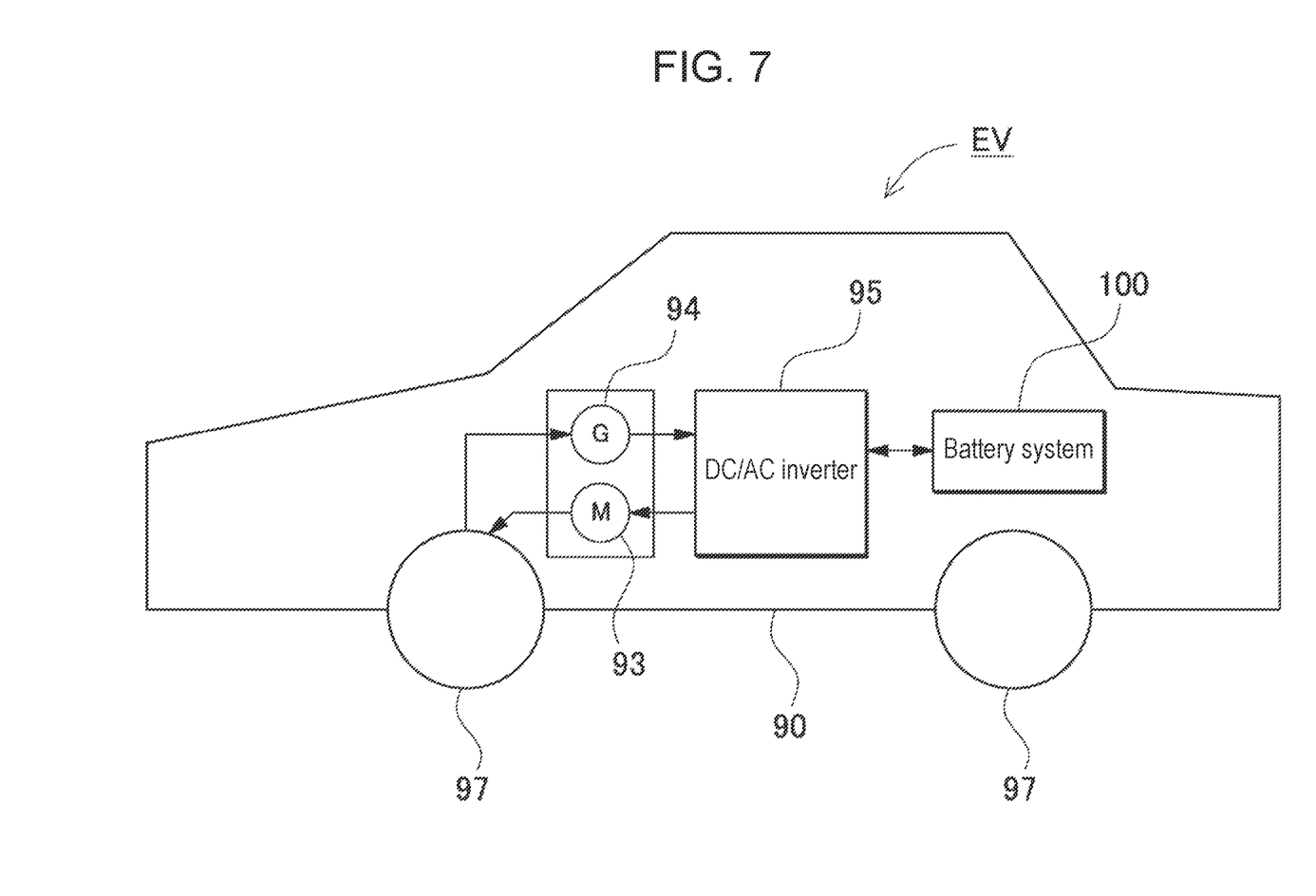
FIG. 7 is a block diagram showing an example in which the battery system is mounted on an electric vehicle travelling only by the motor.

FIG. 7 shows an example in which a battery system is mounted on an electric vehicle traveling only by a motor. Vehicle EV shown in this figure and equipped with the battery system includes vehicle body 90, motor 93 used to travel vehicle body 90, battery system 100 that supplies motor 93 with electric power, power generator 94 that charges batteries of battery system 100, and wheels 97 driven by motor 93 to travel vehicle body 90. Motor 93 is driven when electric power is supplied from battery system 100. Power generator 94 is driven by energy from regenerative braking of vehicle EV and operates to charge the batteries of battery system 100.

(Battery System for Power Storage)

Figure 8:
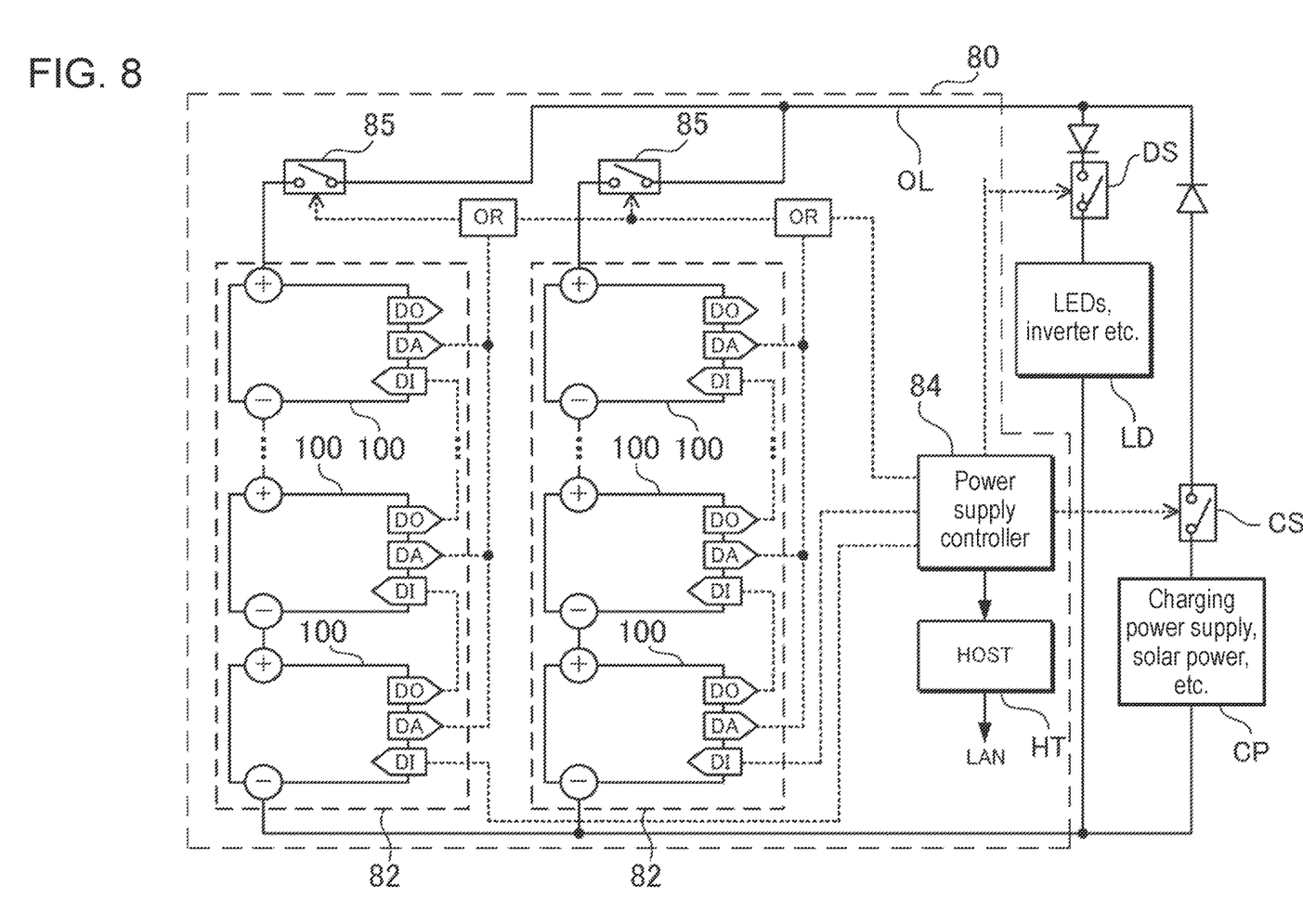
FIG. 8 is a block diagram showing an example of using the battery system for an electricity storage device.

In addition, the present invention does not specify the use of the battery system as a battery system mounted on an electric vehicle. For example, the present invention can be used as a battery system for an electricity storage device that stores natural energy such as solar power generation or wind power generation and can be used for all applications that store high power, like a battery system for an electricity storage device that stores midnight electric power. For example, the battery system can be used as a power source for home use or plant use that is charged with sunlight or with midnight electric power and can be used for a power supply system discharged when necessary, a power source for street lights that is charged with sunlight during the daytime and is discharged during the nighttime, or a backup power source for signal lights driven in the event of a power failure. FIG. 8 shows such an example. In an example use for an electricity storage device shown in FIG. 8, exemplarily described below is electricity storage device 80 achieving large capacitance and high output power by connecting a large number of the battery systems described above in series and in parallel and additionally providing necessary control circuits, to obtain desired electric power.

In electricity storage device 80 shown in FIG. 8, the plurality of battery systems 100 are connected into a unit shape to constitute power source unit 82. In each battery system 100, the plurality of battery cells are connected to each other in series and/or in parallel. Each battery system 100 is controlled by power supply controller 84. In electricity storage device 80, after battery unit 82 is charged by charging power supply CP, electricity storage device 80 drives load LD. Thus, electricity storage device 80 has a charging mode and a discharging mode. Load LD and charging power supply CP are connected to electricity storage device 80 through discharging switch DS and charging switch CS, respectively. Discharging switch DS and charging switch CS are turned ON/OFF by power supply controller 84 of electricity storage device 80. In the charging mode, power supply controller 84 turns charging switch CS ON, and turns discharging switch DS OFF, so that electricity storage device 80 can be charged by charging power supply CP. When the charging operation is completed so that the battery units are fully charged or when the battery units are charged to capacity more than or equal to a predetermined value, in response to a request from load LD, power supply controller 84 turns charging switch CS OFF, and turns discharging switch DS ON. Thus, operation is switched from the charging mode to the discharging mode so that electricity storage device 80 can be discharged to load LD. In addition, if necessary, charging switch CS may be turned ON, while discharging switch DS may be turned ON so that load LD can be supplied with electric power while electricity storage device 80 can be charged.

Load LD driven by electricity storage device 80 is connected to electricity storage device 80 through discharging switch DS. In the discharging mode of electricity storage device 80, power supply controller 84 turns discharging switch DS ON so that electricity storage device 80 is connected to load LD. Thus, load LD is driven with electric power from electricity storage device 80. A switching element such as a field effect transistor (FET) can be used as discharging switch DS. Discharging switch DS is turned ON/OFF by power supply controller 84 of electricity storage device 80. Power supply controller 84 includes a communication interface for communicating with an external device. In the example shown in FIG. 8, power supply controller 84 is connected to host device HT based on existing communications protocols such as UART and RS-232C. Also, the electricity storage device may include a user interface that allows users to operate the power supply system if necessary.

Each battery system 100 includes signal terminals and power supply terminals. The signal terminals include input/output terminal DI, abnormality output terminal DA, and connection terminal DO. Input/output terminal DI serves as a terminal for inputting/outputting signals to/from other battery systems 100 and power supply controller 84. Connection terminal DO serves as a terminal for inputting/outputting signals to/from other battery systems 100. Abnormality output terminal DA serves as a terminal for outputting an abnormality signal of battery system 100 to the outside. Also, the power source terminal is a terminal for connecting battery systems 100 to each other in series or in parallel. In addition, power source units 82 are connected to output line OL through parallel connection switches 85, and are connected in parallel to each other.

INDUSTRIAL APPLICABILITY

A battery system and an electric vehicle and an electricity storage device equipped with the battery system according to the present invention can be suitably used as battery systems of plug-in hybrid electric vehicles and hybrid electric vehicles that can switch between the EV drive mode and the HEV drive mode, electric vehicles, and the like. Also, a power supply device according to the present invention can be suitably used as backup power sources that can be installed on a rack of a computer server, backup power sources for wireless communication base stations such as cellular phones, electric power storages for home use or plant use, electricity storage devices combined with solar cells, such as power sources for street lights, backup power sources for signal lights, and the like.

REFERENCE MARKS IN THE DRAWINGS 100, 200, 300, 400: battery system
1: battery cell
1T: trigger cell
2: battery stack
3: cooling plate
4: end plate
5: bind bar
5a: fixing piece
5b: bent portion
5c: upper bent piece
6: heat insulating material
7: endothermic plate
8: heat insulating portion
9: heat diffusion sheet
10: thermal coupling portions
11: exhaust valve
12: gas exhaust port
13: electrode terminal
15: fixing screw
16: bolt
30: cooling mechanism
31: metal sheet
32: circulating path
33: slit
80: electricity storage device
82: power source unit
84: power supply controller
85: parallel connection switch
90: vehicle body
93: motor
94: power generator
95: DC/AC inverter
96: engine
97: wheel
EV: vehicle
HV: vehicle
LD: load
CP: charging power supply
DS: discharge switch
CS: charge switch
OL: output line
HT: host device
DI: input/output terminal
DA: abnormality output terminal
DO: connection terminal

The invention claimed is:

1. A battery system comprising:
    a battery stack including a plurality of battery cells stacked;
    a cooling plate thermally coupled to each of the plurality of battery cells of the battery stack; and
    a heat insulating material disposed between adjacent ones of the battery cells of the battery stack, the heat insulating material insulating heat between the adjacent ones of the battery cells, wherein
    the cooling plate cools each of the plurality of battery cells to keep a temperature of each of the plurality of battery cells at a set temperature, and serves as an endothermic material having heat capacity to absorb thermal runaway energy of any of the battery cells,
    each of the plurality of battery cells has a thermal coupling part thermally coupled to a corresponding thermal coupling part of the cooling plate,
    the cooling plate includes a plurality of heat insulating parts configured to block heat conduction, and
    each of the plurality of heat insulating parts is interposed between two adjacent thermal coupling parts of the cooling plate, and includes a slit defined in the cooling plate, and a part of the heat insulating material disposed within the slit.

2. The battery system according to claim 1, wherein thermal resistance of the heat insulating material and the heat capacity of the cooling plate are set values that prevent induction of thermal runaway.

3. The battery system according to claim 1, further comprising
    an external endothermic part that is thermally coupled to the cooling plate, wherein the external endothermic part is configured to serve as an additional endothermic material to absorb the thermal runaway energy of any of the battery cells.

4. The battery system according to claim 1, wherein the battery stack has an endothermic plate stacked on the heat insulating material and thermally coupled to each of the plurality of battery cells, and
    the endothermic plate is thermally coupled to the cooling plate.

5. The battery system according to claim 1, wherein a heat diffusion sheet is stacked between the cooling plate and the battery stack.

6. An electric vehicle including the battery system according to claim 1, the electric vehicle comprising:
    the battery system;
    a driving motor supplied with electric power from the battery system;
    a vehicle body including the battery system and the driving motor mounted on the vehicle body; and
    a wheel driven by the driving motor to travel the vehicle body.

7. An electricity storage device including the battery system according to claim 1, the electricity storage device comprising:
    the battery system; and
    a power supply controller for controlling charging and discharging to the battery system, wherein
    each of the plurality of battery cells having a prismatic shape is charged with external power by the power supply controller, and the power supply controller performs control to charge each of the plurality of battery cells having the prismatic shape.

* * * * *